July 3, 1923.

W. C. STEVENS

ELECTROMAGNET

Filed April 22, 1918

1,460,517

Inventor
William C. Stevens
By Frank H. Hubbard
Attorney

Patented July 3, 1923.

1,460,517

UNITED STATES PATENT OFFICE.

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTROMAGNET.

Application filed April 22, 1918. Serial No. 230,014.

*To all whom it may concern:*

Be it known that I, WILLIAM C. STEVENS, a citizen of the United States, residing at Milwaukee, in the county of Milwaukee and State of Wisconsin, have invented new and useful Improvements in Electromagnets, of which the following is a full, clear, concise, and exact description, reference being had to the accompanying drawing, forming a part of this specification.

This invention relates to electromagnets and is particularly applicable to those of the solenoid type.

As is understood, the pull of an ordinary solenoid is at a minimum during the initial part of the stroke of its plunger and increases as the stroke of its plunger progresses. And, as is understood, the pull curve characteristics of an ordinary solenoid may be varied by air gap adjustment and by changing the shape of the sealing ends of the plunger and stationary core but such variations are of limited range and the initial pull is always the minimum pull. On the other hand, there are instances in practice where other pull curve characteristics would be extremely advantageous. For example where a solenoid is employed for shifting automobile transmission gears it is required to perform the maximum work during the initial stroke of its plunger since a greater pull is required to effect initial mesh of the gears than to thereafter move the same into full mesh and a strong initial pull is advantageous for quick meshing of the gears to minimize clashing thereof. Thus a solenoid having a high initial pull and a materially curtailed final pull would be advantageous for such service while in other instances pull curves such as those hereinafter referred to might be more advantageous.

The present invention has among its objects to provide for modification of the pull curve characteristics of solenoids and other electromagnets for better adaptation thereof to the aforesaid and other uses.

A further object is to provide for variation of the pull curve characteristics of solenoids and other electromagnets during movement of their attracted members whereby different pull curve characteristics may be obtained for different portions of the range of movement of such members and whereby various composite pull curves may be obtained for different purposes.

Other objects and advantages of the invention will hereinafter appear.

The accompanying drawing illustrates certain embodiments of the invention which will now be described, it being understood that the invention is susceptible of embodiment in various other forms.

Figs. 3 to 10 inclusive show certain pull curves hereinafter described.

Figure 1:
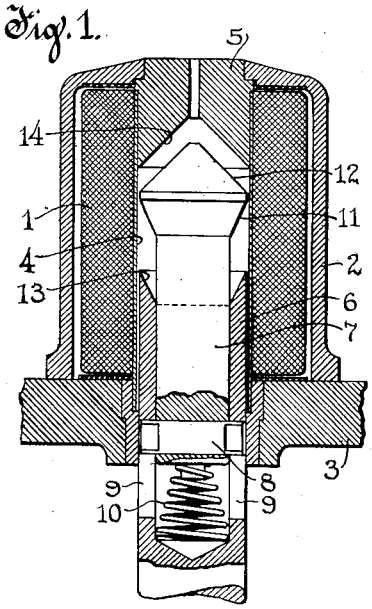
Figure 1 is a longitudinal sectional view of a solenoid embodying the invention.

Referring to Fig. 1, the same shows a solenoid designed for the aforesaid pull curve characteristics which are desired for gear shifting, said solenoid including a winding 1 enclosed in a magnetic housing 2 fixed to a suitable support 3. The winding 1 is provided with a non-magnetic tube 4 extending axially therethrough and a magnetic core 5 is fixed within one end of said tube while a reciprocable magnetic plunger 6 is projected into the opposite end of said tube to be attracted towards said core. The plunger 6 has its upper end centrally bored to receive a reciprocable magnetic plug 7 which is provided with a cross pin 8 working in slots 9 in said plunger. Thus while the plug is reciprocable within the plunger its play is limited to the length of the slots 9 and a coil spring 10 is interposed between said plug and plunger to bias the former outwardly from the latter. And the plug has at its outer end an enlarged head having opposed conical surfaces 11 and 12, the former to be projected into a recess 13 in the end of the plunger and the latter to be projected into a recess 14 in the stationary core 5.

Thus with the plunger 6 positioned as illustrated the plug is projected into the air gap to provide a magnetic shunt for the major part of said air gap. In other words, the magnetic circuit of the solenoid is provided with two reluctances which provide two magnetic field components, one between the core and the extremity of the plug and the other between the head of the plug and the extremity of the plunger, and in view of the magnetic shunt provided by the plug such magnetic field components will be unsymmetrical. And as will be apparent, the unsymmetrical relation of the two magnetic field components thus provided, will render such components effective progressively for attraction of the plunger, or in other words, will render each effective for a different portion of the stroke of the plunger. Also, as will be apparent, the structure illustrated is such that the magnetic field component between the core and the plug will be effective for the initial portion of the stroke of the plunger and since the air gap between said parts is relatively small while the cross section of the plug is relatively great, a strong initial pull on the plunger will be insured. On the other hand, since the magnetic field component between the head of the plug and the plunger is dependent upon saturation of the plug and the leakage flux about the same, the pull on the plunger under the influence of such magnetic field, will be greatly curtailed throughout the remainder of the stroke of said plunger.

Figure 3:
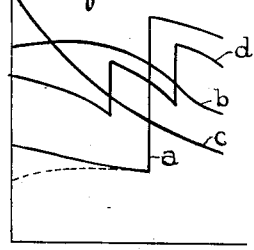

Accordingly, with a solenoid such as described it is possible to obtain a pull curve such as depicted by curve $a$, Fig. 3, as contrasted with the pull curves $b$ and $c$ which are typical of ordinary solenoids respectively provided with conical and flat ended plungers. And referring to curve $a$, it will be observed that the same starts at a much higher point than either of the curves $b$, $c$ and rises slightly during movement of the plunger to seal the plug against the core, whereupon the curve drops abruptly to a point below both curves $b$ and $c$ and then rises slightly during the remainder of the stroke of the plunger. The reduction in pull upon sealing of the plug and core will, of course, be determined by the relative cross sectional areas of the plug and plunger and hence may be readily curtailed or increased by relative variations in the cross sectional areas of said elements. Moreover, as will be apparent, the sealing faces of the plug and plunger may be altered to provide a final pull as indicated by the dotted line curve, Fig. 3, while the number of plugs may be increased to provide for the division of the magnetic field into a greater number of components, with the result of modifying the pull as depicted by curve $d$.

Figure 2:
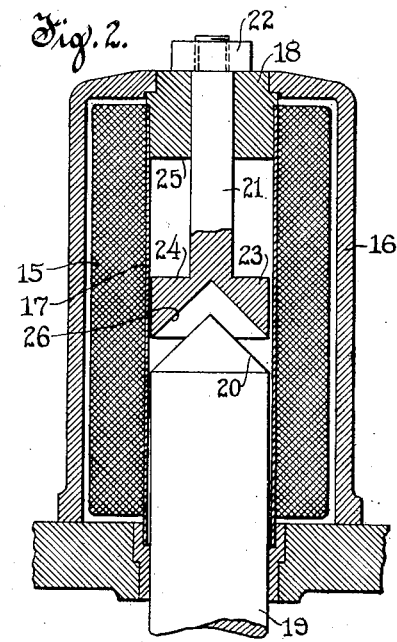
Fig. 2 is a longitudinal sectional view of a modification of Fig. 1.

Referring to Fig. 2, the same shows a solenoid comprising a winding 15 enclosed in a magnetic frame 16 and having a non-magnetic tube 17 extending axially therethrough, a stationary magnetic core 18 and a movable plunger 19. The plunger in this instance is solid and provided with a conical end 20 while the core 18 is of tubular form and provided with a magnetic plug 21 reciprocably mounted therein, said plug having a collar 22 threaded onto the outer end thereof to engage the stationary core for limitation of its movement towards the plunger and being provided with an enlarged head 23. As shown, the plug 21 is of less cross sectional area than the plug 7 of Fig. 1 and has a flat face 24 to seal with a flat face 25 of the core 18, while it has a conical recess 26 to receive the conical end 20 of the plunger 19. However, the plug might be identical with the plug 7 of Fig. 1 and then assuming the sealing faces of the core and plunger to be the same as in Fig. 1, the plug might be suspended in the air gap to produce the same results as in the former solenoid. Also, the plug 21 might be formed of a non-magnetic stem and a magnetic head to provide two distinct air gaps between the plunger and core for different portions of the stroke of the plunger.

Figure 4:
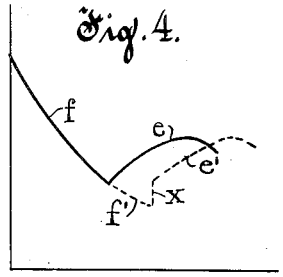

With the plug 21 formed of magnetic material, the magnetic field component between the plunger and the plug will effect a pull during the initial part of the stroke of the plunger, substantially as depicted by the curve $e$, Fig. 4, while the magnetic field component between the plug and the core will effect a pull during the remainder of the stroke of the plunger, substantially as depicted by curve $f$, said curves intersecting to provide a composite curve $ef$ for the full stroke of the plunger. And as will be apparent the relative values of the component reluctances of the total air gap may be varied for numerous variations of such composite curve. For example, assuming a variation to supplement curve $f$ by dotted line curve $f'$ while maintaining the same pull curve characteristics for the initial stroke of the plunger as depicted by curve $e'$, then the pull provided by the magnetic field component between the plug and core would be initially less than the sealing pull of curve $e'$ whereby the pull for the full stroke of the plunger would be substantially as depicted by the composite curve $e'$, $x$, $f'$, $f$. Thus in both cases while the initial pull is less than the final pull, it is greater than the minimum pull, the latter pull occurring at some intermediate point in the stroke of the plunger.

Figure 5:
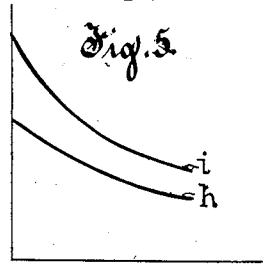
Figure 6:
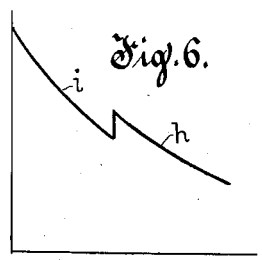
Figure 7:
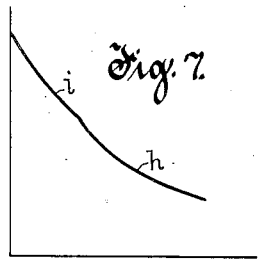

Referring to Fig. 5, the same shows other pull curves $h$ and $i$ which may be respectively obtained for the initial and final portions of the stroke of the plunger by suitable air gap adjustments and by flattening the sealing faces. And a solenoid having such pull curve characteristic for different portions of the stroke of its plunger may be adjusted for various composite pull curves such for example as those shown in Figs. 6 and 7, both of which provide for a wide range of variations in pull and the former of which provides for an abrupt decrease in pull at an intermediate point in the stroke of the plunger.

Figure 8:
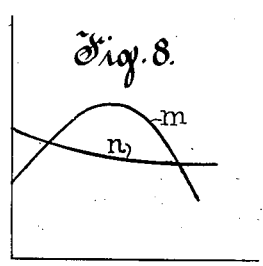
Figure 9:
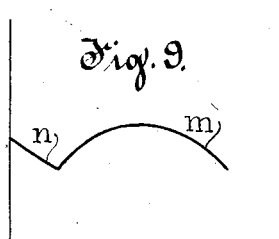
Figure 10:
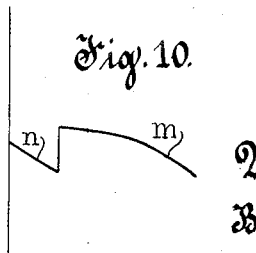

On the other hand, a solenoid such as described may be readily designed and adjusted to provide pull curves such as shown in Fig. 8 which pull curves may be used to produce relatively flat composite curves, such, for example, as those shown in Figs. 9 and 10. Referring to Fig. 8, the curves $m$ and $n$ respectively depict the pull characteristics for the initial and latter portions of the stroke of the plunger and as will be apparent the sealing pull depicted by curve $m$ is less than the minimum pull depicted by curve $n$. Accordingly should the initial air gap be entirely eliminated the plunger would not complete its stroke but as will be apparent it is possible to insert a non-magnetic spacer between the magnetic members to limit curtailment of the initial air gap and thereby render the other magnetic field effective for completion of the stroke of the plunger. And as will be apparent, the composite pull curves shown in Figs. 9 and 10 may be obtained by variations in the limit of curtailment of the initial air gap.

What I claim as new and desire to secure by Letters Patent is:

1. An electromagnet comprising a winding and relatively movable magnetic parts to be attracted thereby axially thereof, one of said parts having portions of different cross sectional areas adapted to provide in conjunction with the other of said parts a magnetic path for a portion of the magnetic flux of said winding including a plurality of air gaps bearing a series relation and to also provide a magnetic path for another portion of the magnetic flux of said winding exclusive of certain of said air gaps.

2. An electromagnet comprising a winding and relatively movable magnetic parts therein including a movable plunger and a part to divide the magnetic field of said winding into sections bearing a series relation and to concentrate the magnetic flux in certain of such sections independently of other of such sections.

3. An electromagnet comprising a winding, a stationary magnetic member, a movable magnetic member and a second movable magnetic member interposed between the former members to divide the air gap therebetween, said latter member being movable with respect to said second mentioned member and having a portion intercepting substantially all magnetic lines of force extending between said first and second mentioned members.

4. An electromagnet comprising a winding, a stationary magnetic member, a movable magnetic member and a second movable magnetic member interposed between the former members to divide the air gap therebetween, said latter member having a portion intercepting substantially all magnetic lines of force extending between said first mentioned members and having another portion connecting the same to one of said first mentioned members, to provide a magnetic shunt for one component of said air gap.

5. An electromagnet comprising a winding, relatively movable magnetic parts to be magnetized thereby and a magnetic part interposed between said former parts to divide the magnetic field therebetween into unsymmetrical sections, said interposed part having faces to seal with both of said first mentioned parts.

6. In an electromagnet, in combination, magnetic members having an air gap therebetween, a winding to magnetize said members for attraction of one towards the other and a magnetic element of varying cross section interposed between said members and movable relatively to both, said element providing a shunt for a limited part of the total air gap between said members.

7. In an electromagnet, in combination, magnetic members having an air gap therebetween, a winding to magnetize said members for attraction of one towards the other and a magnetic element of varying cross section interposed between said members to provide a shunt for the magnetic flux therebetween and to provide for variation of the cross section of the useful air gap between said members relative to the cross section of such shunt to vary the magnetic pull on said attracted member.

8. An electromagnet comprising magnetic members, one of which is movable toward and away from the other, a winding for magnetizing said members and a magnetic plug of varying cross section associated with one of said members and having a limited play independently thereof toward and away from the other of said members.

9. An electromagnet comprising magnetic members, one of which is movable toward and away from the other, a winding for magnetizing said members, and a magnetic plug reciprocably mounted in one of said members and having an enlarged head interposed between said members, said plug having its movement relative to its supporting member limited to provide a given air gap between the same and the other of said members when said movable member is in an extreme position.

In testimony whereof, I have hereunto subscribed my name.

WILLIAM C. STEVENS.